United States Patent [19]

Walket

[11] 3,786,521

[45] Jan. 22, 1974

[54] SWINGING BAFFLE ELEMENT FOR WATER TURBULENCE SUPPRESSION SYSTEMS

[75] Inventor: Mercer Donald Walket, Medina, Ohio

[73] Assignee: Adolph Kiefer McNeil Corporation, Akron, Ohio

[22] Filed: July 13, 1972

[21] Appl. No.: 271,360

[52] U.S. Cl. .................................... 4/172.15, 9/8
[51] Int. Cl. ........................... E04h 3/16, E04h 3/18
[58] Field of Search ..................... 4/172, 172.15; 9/8

[56] References Cited
UNITED STATES PATENTS

| 2,117,982 | 5/1938 | Prince, Jr. | 4/172.15 |
| 3,011,178 | 12/1961 | Stone | 4/172 |
| 3,050,750 | 8/1962 | Harrison | 9/8 |
| 3,074,083 | 1/1963 | Schirmer | 9/8 |
| 3,116,925 | 1/1964 | Welch | 9/8 |
| 3,304,560 | 2/1967 | Kiefer | 4/172.15 |
| 3,540,063 | 11/1970 | Stanwood | 4/172 |

Primary Examiner—Henry K. Artis
Attorney, Agent, or Firm—Arnold B. Christen et al.

[57] ABSTRACT

A swimming pool turbulence reducing system employs a taut restraining cable positioned approximately at the water line to rotatably support a series of closely spaced baffle plates arranged in planes parallel with the axis of the cable, the mass and the surface areas of the plates being unequally distributed with respect to the rotatable axis so that the baffle plates tend normally to depend downwardly from the cable and will yieldingly swing from side to side in resisting wave movement.

19 Claims, 5 Drawing Figures

SWINGING BAFFLE ELEMENT FOR WATER TURBULENCE SUPPRESSION SYSTEMS

This invention relates to aquatic devices and, more particularly to systems for defining racing lanes and reducing turbulence in swimming pools and other bodies of water.

A device of this type has been described and claimed in U.S. Pat. No. 3,304,560, granted to Adolph G. Kiefer on Feb. 21, 1967, and assigned to the assignee of the present application.

Said Kiefer patent utilized a series of hollow cylindrical elongated bodies having perforated surfaces defined by a series of integrally molded lastic strips which criss-crossed each other in what may be called a lattice-work fashion. These bodies are confined in axial alignment by means of a line, or cable, attached at opposite ends of a swimming pool and maintained under tension for the purpose of holding the individual bodies substantially one-half submerged. In addition, since the assembly of lattice-like bodies and cable has a slightly negative buoyancy, floats are attached to the cable (or the bodies) to assist in maintaining the bodies one-half submerged.

The assembly of bodies just described can be briefly stated as being effective to substantially eliminate the passage of disturbed water, caused by the efforts of a high-speed swimmer proceeding in one racing lane, from being transmitted to the next adjacent lane. This results from the fact that the turbulence of the wake produced by the moving swimmer is absorbed, or dampened, when it reaches the turbulence reducing bodies by the fact that the waves and troughs forming the wake are broken up and water is aerated reducing driving force of waves by the perforated surfaces and portions of the kinetic energy in the wake is absorbed by efforts expended in rotating the turbulence reducing bodies which are freely rotatable about the restraining cable.

Another device of this type, which operates substantially in accordance with the principles originally disclosed in the aforementioned Kiefer patent, is disclosed in U.S. Pat. No. 3,540,063 granted to David A. Stanwood on Nov. 17, 1970.

A further improvement in devices of this type is disclosed and claimed in the copending application of Mercer Donald Walklet, Ser. No. 238,798, filed Mar. 28, 1972 and also assigned to the assignee of the present invention, in which the wave suppression assembly comprises a continuous series of open-faced perforated discs, resembling spoked wheels, strung together in axially aligned and axially spaced relationship on a taut line, or cable, so that each of the elements is independently freely rotatable about its central axis.

One advantage of the assembly disclosed in the copending Walklet application is, therefore, that it is more restrictive to irregular wake patterns, or eddy currents, than the prior devices of the Kiefer type in which each of the freely revoluble elements comprised an elongated body. Thus, in the prior art, any force acting, for example on one side of an elongated turbulence reducing body and sufficient to effect movement of the body, created a slight counter turbulence back into the area from which the force acting was generated.

In addition, the shorter length and larger diameter of the disc-shaped bodies disclosed in the copending Walklet, application, having greatly reduced mass, effectively reduces the inertia of each body and makes possible a more localized control of small disturbances in the water.

Further, by using a large number of turbulence reducing bodies of individually short axial length, means that, as a practical matter, there are no limitations on the dimensions of the racing lanes which can be protected, whereas in the earlier Kiefer and Stanwood assemblies, in which each element was approximately a foot, or so, in length, a gap in the lane always existed at every multiple of the element. If the length of the pool is not an exact multiple of the length of the element, there would also be an unfilled gap in the lane. In the copending Walklet embodiment, and in the embodiment of the present invention, the axial length of each element is preferably no more than an inch or two, and elements can be added, or subtracted, at will so that a continuous barrier along the sides of a lane can always be obtained regardless of the length of the lane in use.

However, a common feature of all of the foregoing prior art turbulence reducing systems is the provision of rotary baffle elements, or damping devices, whose physical configurations are symmetrical with respect to the axis of rotation and whose mass is also correspondingly balanced with respect to the axis of rotation about the restraining cable. Accordingly, these devices depend, for their effectiveness, upon the generation of resultant opposite forces resisting the rotation of the damping elements for suppression of wave patterns creating turbulence.

In the case of the present invention, the individual baffle elements are unbalanced, with respect to their centers of rotation about the restraining cable, both as regards to their physical configuration and/or as to their distribution of mass. Consequently, under normal undisturbed conditions the baffle elements tend to adopt a certain fixed position relative to the restraining cable, and resistance to movement of a wave pattern across the line defined by a series of baffle elements is resisted to some extent by the force required to rotationally displace the baffle elements from their normal positions.

Other objects and advantages will be apparent to those skilled in the art after reading the following specification in connection with the attached drawings, in which.

Figure 1:
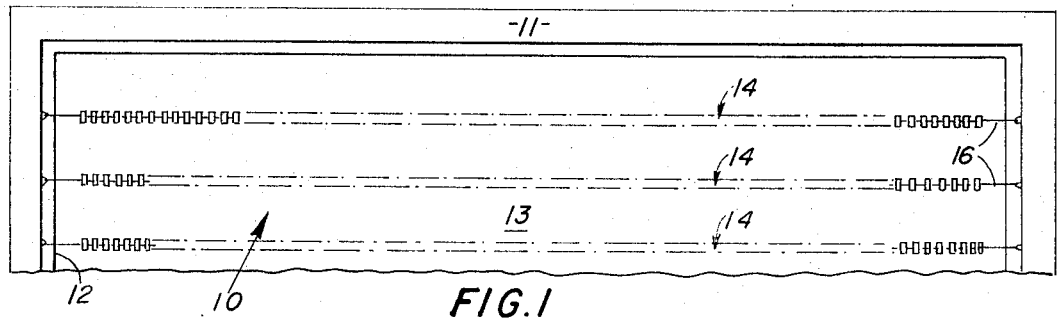
FIG. 1 is a plan view of a portion of a body of water, such as a swimming pool, showing a preferred form of turbulence reducing assembly according to the invention, arranged to define several parallel racing lanes for swimmers.

In the drawings, one side of a typical swimming pool 10, is shown in FIG. 1, having side walls 11 and end walls 12 to confine a body of water 13. Extending between the end walls are a series of wave suppression, or turbulence reducing devices, indicated generally by numeral 14, which define a plurality of parallel lanes in the water each of which is for the use of an individual swimmer taking part in competitive swimming events. Each of the turbulence suppressing assemblies 14 is preferably composed of a series of baffle elements, or perforated plate-shaped devices, indicated generally by numeral 15, which are held in alignment by restraining means, such as a rope, or cable, 16 attached to the opposite end walls 12, of the pool. Preferably, the cable is maintained in a taut condition by a suitable tensioning device, such as a turn-buckle, winding reel, or other conventional means (not shown) and is positioned substantially at the water line so that the lower portions of elements 15 will lie normally submerged, for reasons which will be apparent later.

For practical reasons, the most common form of restraining means includes a braided, or twisted, steel wire cable having a plastic coating, such as that sold under the trademark Wirelon, but non-metallic ropes would not be ruled out provided they have sufficient resistance to elongation under tension to keep the elements 15 in substantial alignment. However, when wire rope, or other metallic cables are used, which have a specific gravity much higher than water, it is desirable to include float means to assist in holding the cable substantially at water level along its entire length. Of course, one method of accomplishing this would be to manufacture the bodies 15 from a lightweight material, such as a cellular synthetic plastic material.

Again, however, due to the state of the art and the exigencies of conventional manufacturing practices, it has been found that cellular plastic materials either are too fragile for continuous everyday use or, are too expensive to mass produce. Therefore, in practice it has been found desirable to mold the elements 15 from unfoamed plastics, such as polyvinyl chloride or the like which, when completed, have a specific gravity only slightly less than water and to include means, such as the floats indicated generally by numeral 17, deployed at intervals along the length of the wave suppression assembly 14, the effect of which is to maintain the restraining cable 16 approximately at the water level along its entire length.

Furthermore, in order to accommodate the various floats 17 without substantially altering the uniformity of the wave damping pattern presented by the series of bodies 15, a pair of modified forms of wave damping body, indicated generally by numeral 18, are preferably positioned on either side of each of the evenly spaces floats in the lane.

Figure 2:
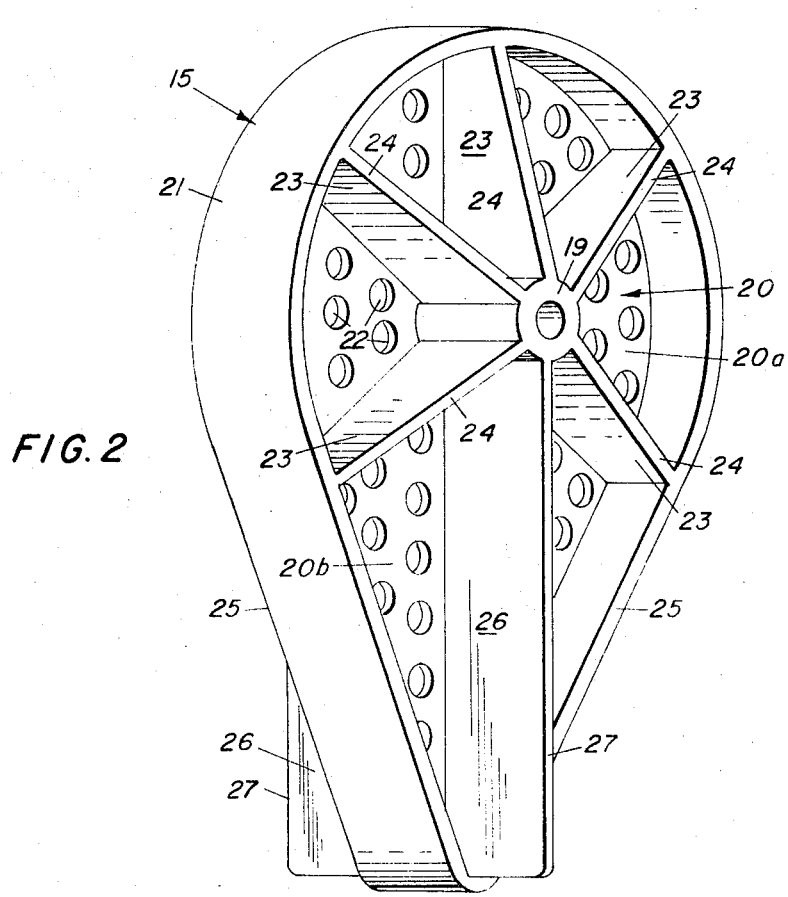
FIG. 2 is a perspective view of one of the baffle elements comprising the assembly shown in FIG. 1, on an enlarged scale.

Turning now to FIG. 2, where one of the individual baffle elements 15 is shown in more detail, it will be seen that it comprises a supporting portion, which may consist of a hollow hub portion 19, having a central bore through which the cable 16 may pass freely. Approximately midway of the length of the hub, there is a radially extending web, or spider 20, which, for convenience may be said to resenble the inverted crosssection of a tear drop having a hemicircular upper portion 20a which merges into an inverted triangular lower portion 20b, the entire periphery of this web being encircled by baffle rim 21 extending on both sides of the web, or spider, in a direction parallel with the cable 16. Further, to assist in damping the longitudinal component of wave forces, the web member 20 may be provided with a multiplicity of openings 22, and while these are shown as being circular, the exact configuration is not important so long as the web portion 20 serves to impede, aerate, or dampen and break up waves moving diagonally from one side of the assembly of elements 15 to the other side. In fact, the element 20 could also comprise a series of radially extending flat, or fanshaped, spokes which would accomplish the same purpose.

In order to assist the effect of the annular ring 21 in dissipating the lateral component of force of a wave, the disc-shaped elements 15 may also be provided with a series of axially extending baffle surfaces which in a preferred form comprise a series of preferably equiangularly arranged vanes, or blades, indicated generally by numeral 23, radiating outwardly from the hub 19. While there are five of these blades shown in the drawings, it is considered that this number is not critical, although with less than three it is considered that the effectiveness of the device would be reduced. Each of the blades has an axial margin 24 which at the root of the blade may start at the extremity of the hub and inclines axially inwardly to merge with the margins 25 of the rim 21 in order not to interfere with the individual free rotation of the elements 15, which otherwise would result from interference between the blades of adjacent rotary elements.

Figure 3:
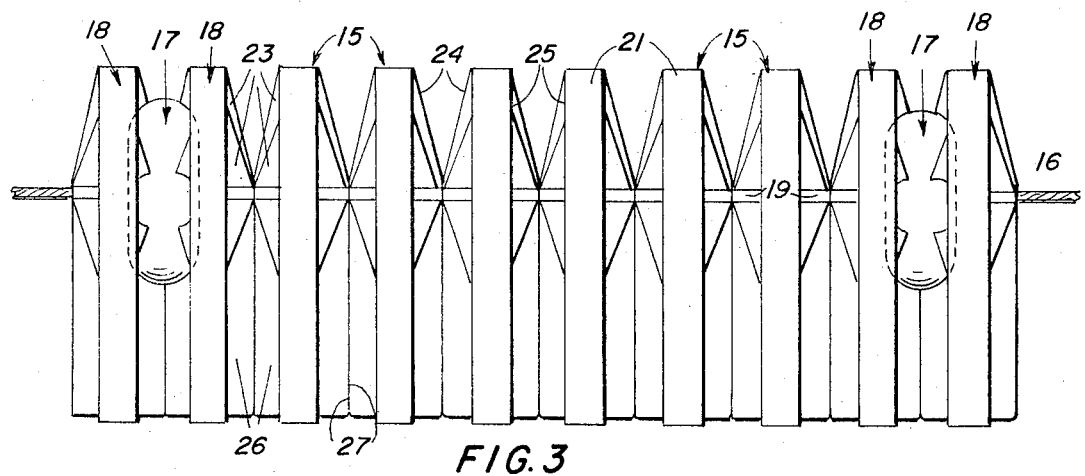
FIG. 3 is a side elevation of a portion of the assembly shown in FIG. 1, on an enlarged scale

In addition, a generally rectangular baffle blade 26 extends downwardly from the hub 19 to the vertex of the triangular lower portion of the web 20b, the width of this blade being approximately equal to the length of the hub, both of which extend in an axial direction beyond both margins 25 of the rim 21, with the result that the marginal edges 27 of adjacent baffles 26 will be normally in nearly abutting relationship when the assembly is supported on cable 16, as can be seen in FIG. 3.

Figure 4:
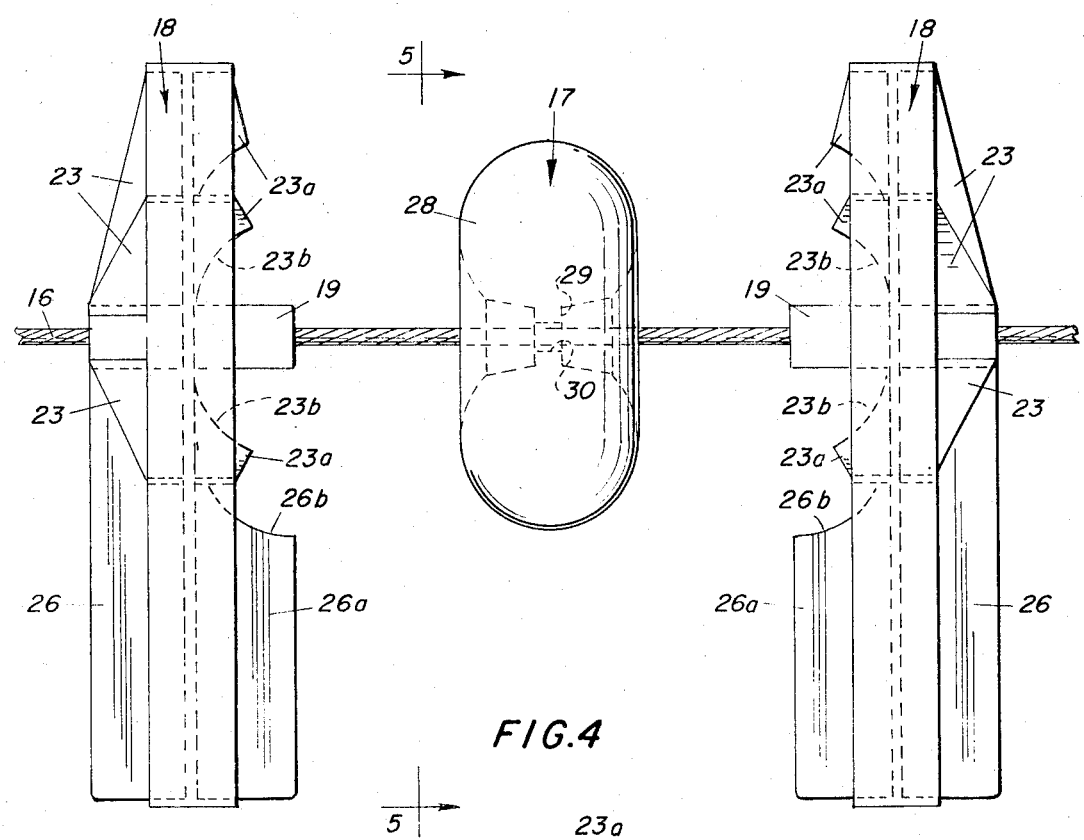
FIG. 4 is a side elevation of a float means employed in the arrangements of FIGS. 1 and 2, together with a pair of modified baffle elements adjacent the float means.
Figure 5:
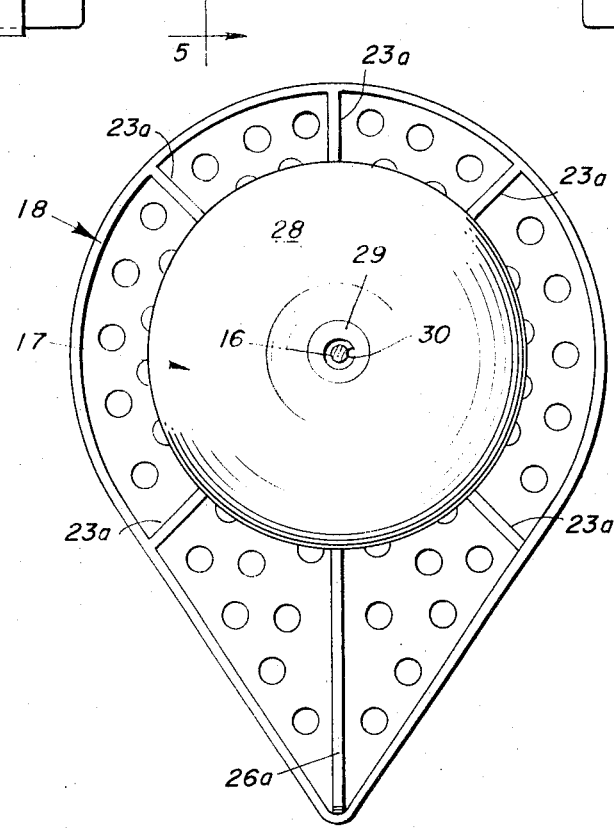
FIG. 5 is an end elevation of the float means and adjacent rotary body as viewed from the plane of line 5—5 of FIG. 4.

As stated above, at appropriate intervals the floats 17 are strung on the restraining cable 16. While various types of floats can be used, such as a foamed plastic block, in FIGS. 4 and 5, it can be seen that the preferred form comprises a hollow toroidally shaped body 28, having a central web 29 provided with a concentric opening 30 to position the float for freely sliding movement on the cable 16. The overall diameter of the float is preferably such that it may be placed between a pair of wave suppression devices 18, which are similar to the devices 15 in that they include a hub 19, perforated web 20, peripheral rim 21 and a set of vanes 23 and 26 on one side of their respective webs. They differ, however, in that the vanes, or blades 23a and 26a formed on the other side of the web are cut out, as at 23b and 26b, along a circular arc corrresponding to the shape of the toroidal body 28 of the float. Thus, the float can be accommodated between the devices 18 in a manner which makes it possible to maintain a generally uniform spacing between the rims 21 and the transverse baffles 20 along the entire length of the assembly 14 regardless of how may floats are used to maintain uniform buoyancy and regardless of the location of the floats. And it also makes it possible to provide a substantially continuous depending barrier wall defined by the individual closely spaced baffle blades 26 and 26a.

By comparison with prior forms of turbulence reducing devices, which rely upon "churning" of the wave patterns developed by swimmers, or other moving objects and the consequent dissipation thereof almost entirely by development of Rinetic enerty resulting therefrom, in the case of the present invention the wave patterns are suppressed more or less by balancing of the wave forces or by channeling the wave patterns in a downward direction.

This will be understood from the fact that (as seen in FIG. 3) the depending blades 26 form a substantially continuous wall below the water line, individual portions of which will yield in response to the force of a wave approaching from either side of the restraining cable. However, the tapered configuration of the shorter baffles 23 offers considerably less surface to the approaching wave, with the result that the baffle element as a whole will merely swing about the cable 16 to a certain degree to channel the major portion of a wave downwardly below the cable while a small amount of water will flow between adjacent blades 23. The fact that the center of mass of the elements 15 or 18, as a whole, is displaced below the level of the pivotal axis defined by the hub 19 means that the baffle elements ordinarily will only swing about an angle of considerably less than 90°, rather than rotate completely. The yielding resistance of the blade 26 is also enhanced by the fact that water passing between adjacent baffle elements above the cable will encounter the blades 23 which developes a rotational force opposing the swinging of the lower blade.

And, while the arcuate upper portion of the rim 21 does not exert any rotational force in contact with wave action, the depending portion of the rim below the level of the cable does exert a force, in combination with the elongated blade 26, which tends to smother approaching waves, and this smothering effect can be increased by increasing the weight of the lower portion of a baffle element either by the inclusion of metal, or by increasing the thickness of the material in that portion of the element. Obviously, the web, or spider, 20 exerts a damping effect on the component of force produced in the direction parallel to the length of cable 16 as in the case of the prior Walklet device.

I claim:

1. A turbulence reducing system for use in a body of water comprising a horizontally extended restraining cable secured at its opposite ends under tension, means to meaintain said restraining cable substantially at the water line along its entire length, and a plurality of baffle elements swingably mounted on said restraining cable, said baffle elements including an elongated blade disposed in a plane generally parallel with the axis of said cable, the center of mass of the axis of said baffle elements being downwardly offset with respect to the axis of rotation to normally position said elongated blades in downwardly depending generally aligned relationship.

2. The invention defined in claim 1, wherein said baffle elements include at least one additional blade extending in a plane generally parallel with the axis of said restraining cable, the effective surface area of said additional blade less than the effective surface area of said elongated blade.

3. The invention defined in claim 2, wherein said baffle elements include a hub portion provided with an opening to receive the restraining cable, said elongated blade being rectangular and having a width corresponding to the length of said hub portion, said baffle elements also including a plurality of additional blades extending radially outwardly form said hub, the effective surface area of each of the additional blades being less than the effective surface area of the elongated blade.

4. The invention defined in claim 3, wherein said baffle elements also include a perforate baffle surface extending in a plane transverse to said restraining cable.

5. The invention defined in claim 4, wherein said baffle elements also include a peripheral rim portion extending between the extremities of said elongated blade and said additional blades.

6. The invention defined in claim 5, wherein the width of said rim is uniform and less than the width of the extremity of said elongated blade.

7. Baffle means for use in a water turbulence reducing system comprising an element provided with support means pivotal about a horizontal axis approximately at the usual water level of a body of water, said element including vane means provided with a surface exposed to the forces of water action moving in a horizontal direction transverse to said pivotal axis, the effective area of said surface exposed below said axis being substantially greater than the effective area of said surface exposed above said axis, whereby the baffle means tends to divert downwardly any water moving against said exposed surface in said transverse direction.

8. The invention defined in claim 7, wherein said element also includes a surface disposed transverse to said pivotal axis to restrict the movement of water in directions parallel to said pivotal axis.

9. The invention defined in claim 8, wherein said means having a surface disposed transverse to the pivotal axis comprises a plate-shaped element, the configuration of said plate-shaped element being symmetrical with respect to a line extending transversely through said pivotal axis.

10. The invention defined in claim 9, wherein the configuration of said plate-shaped element is assymetrical with respect to another line extending transversely through said pivotal axis and angularly with respect to said first mentioned line.

11. The invention defined in claim 8, wherein said surface of the vane means exposed to the forces of water action projects outwardly on both sides of said plate-shaped element and in symmetrical horizontal relation thereto.

12. The invention defined in claim 11, wherein at least a portion of the extremity of said plate-shaped element terminates in a rim extending outwardly on both sides of the plate-shaped element in the directions of the pivotal access, and said baffle means also includes spacer means to coact with spacer means of an adjacent baffle means to allow water to flow to the plate-shaped element over the edges of said rim.

13. The invention defined in claim 7, wherein said vane means is provided with corresponding opposite surfaces to divert downwardly water moving in either horizontal direction transverse to said pivotal axis.

14. The invention defined in claim 13, wherein said vane means includes a surface extending in a plane passing through said pivotal axis.

15. The invention defined in claim 13, wherein said vane means includes a second surface disposed in a plane angularly related to said first mentioned surface.

16. The invention defined in claim 15, wherein said vane means includes a third surface disposed in a plane angularly related to said second and first mentioned surfaces.

17. The invention defined in claim 16, wherein said second and third surfaces extend on both sides of said pivotal axis, the effective areas of said second and third surfaces disposed on opposite sides of a plane passing through said pivotal axis being substantially equal.

18. The invention defined in claim 17, wherein the surface of siad first mentioned vane means passes through said pivotal axis, and the effective areas of said second and third vane means are disposed symmetrically on opposite sides of the plane of the first mentioned vane means.

19. The invention defined in claim 13, wherein that portion of the surface of said vane means lying on one side of a plane passing through said pivotal axis terminates in two complementary margins spaced from each other in the longitudinal direction of said axis whereby when two or more of said baffle means are arranged adjacent to each other with said vane means in alignment a substantially continuous surface is formed.

* * * * *